Apr. 24, 1923.
N. COLLION
GEAR SHIFT LOCK
Filed June 2, 1921
1,453,004
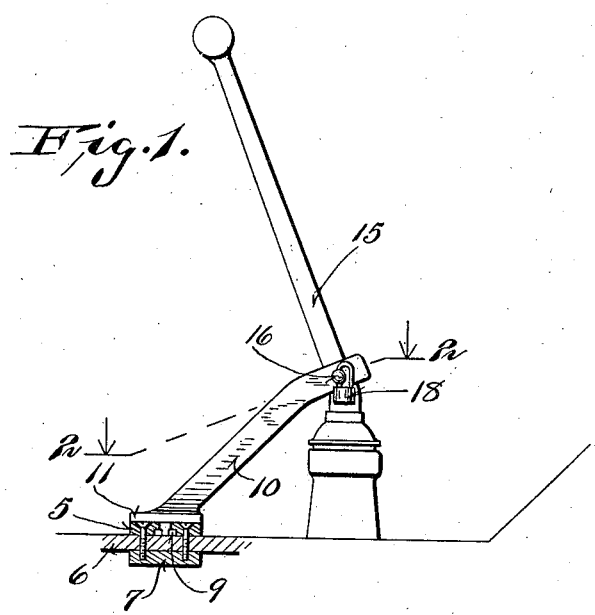
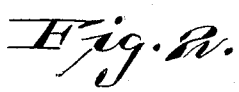
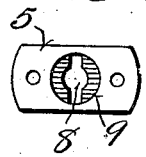
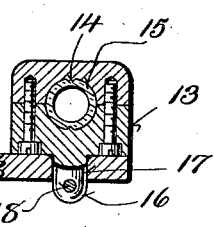
Inventor
Nicholas Collion
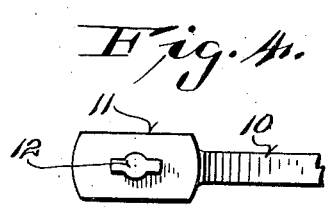
Attorneys Patented Apr. 24, 1923.

1,453,004

UNITED STATES PATENT OFFICE.

NICHOLAS COLLION, OF MILWAUKEE, WISCONSIN.

GEAR-SHIFT LOCK.

Application filed June 2, 1921. Serial No. 474,357.

*To all whom it may concern:*

Be it known that I, NICHOLAS COLLION, a citizen of the United States, and resident of Milwaukee, in the county of Milwaukee and State of Wisconsin, have invented certain new and useful Improvements in Gear-Shift Locks; and I do hereby declare that the following is a full, clear, and exact description thereof.

This invention relates to a new and useful improvement in a gear shift lock for motor vehicles, and its general object is to provide a lock of this kind which may be cheaply manufactured and at the same time may be made of substantial strength so that it cannot be easily broken.

A further object is to provide a lock which may be easily installed in a motor vehicle by means of screws and in which the securing screws are concealed or held against possible removal when the device is locked in position.

With the above objects in view, my invention comprises certain structural details which will be described in connection with the accompanying drawing in which, Figure 1 is a side elevation of my invention, a part thereof being shown in section.

Figure 2 is a sectional plan view on the line 2—2 of Figure 1, and

Figures 3 and 4 are detail views showing the means for securing the device to the floor of the vehicle.

Referring to the drawing by reference characters, the numeral 5 designates a block which is attached to the flooring 6 by means of suitable screws which are countersunk in the block and extend through the floor of the vehicle where they are screwed into a heavy washer 7. The upper side of the block is provided with a keyhole 8, underneath which is an enlarged cavity 9. The arm 10 which connects the block to the gear shaft lever is provided with an elongated head 11 and a key 12. It will be understood that after the block 5 has been attached to the floor, the key 12 may be inserted through the hole 8, and the arm 10, revolved through an arc of 90°. The head 11 will then be keyed to the block 5 in position to conceal the screws and prevent their removal.

A split block 13 is attached by means of screws to the gear shift lever 15. Projections 14 are provided in the block 13 which engage corresponding recesses which are prepared in the gear shift lever, thus securing the block against displacement on the lever. The block 13 is provided with an outwardly projecting lug 16, which may be inserted in the hole 17 in the end of the arm 10 and securely locked therein by any suitable lock, as shown at 18. The screws which hold the block 13 on the lever are so located that they are effectively concealed by the arm 10 when locked in position, thus preventing the unauthorized removal of the same from the lever.

In the application of my device to a motor vehicle, it may be attached so as to lock the gear shift lever in neutral position or in reverse position, as may be desired. When the device is locked in position, the attaching screws will be concealed and it will be practically impossible to remove the lock or shift the gears. It will be seen that my device can be very cheaply manufactured and its nature makes it adapted to be made of substantial dimensions so that it will be strong and offer the maximum resistance to any one attempting to tamper therewith.

While I have described specifically one form in which my invention may be embodied, it will be understood that various modifications may be made in the structural details without departing from the spirit of the invention.

I claim:

1. An attachment for motor vehicles comprising a block provided with means for securing it to the floor of the vehicle, said block having a slot therein, and an interior cavity in communication with said slot, an arm having a head adapted to removably seat on said block so as to conceal the securing means, said head having a key thereon insertible in said slot and securing said head against removal when turned angularly to said slot, and means operable when the head is keyed to the block for locking the other end of said arm to the gear shift lever to prevent the latter from being shifted.

2. An attachment for motor vehicles comprising a block provided with means for securing it to the floor of the vehicle, an arm having at one end a head keyed to said block in such a position as to conceal said securing means, a block secured to the gear shift lever and means for locking the other end of the arm to the second named block, to secure the gear shift lever against being shifted, said arm when locked being in position to conceal the securing means for the second named block and being detachable from both blocks when unlocked.

3. An attachment for motor vehicles comprising a block provided with means for securing it to the floor of the vehicle, a second block provided with means for securing it to the gear shift lever, a connecting arm having a head at one end, said head having a key and slot connection with one of said blocks, and means for locking the other end of the arm to the other block in such a position that the securing means of both blocks will be concealed, said key and slot connection being separable only when the locking means is unlocked.

4. A locking device for the shifting lever of a motor vehicle comprising a split block, means for rigidly securing the block to the shifting lever, one section of the block having a projecting lug, a second block provided with means for securing it to the floor, a locking arm keyed at one end to said second block and having a hole tapped through the other end for receiving said lug, and means for locking it to the lug, said arm when locked being in position to conceal the securing means for both blocks.

In testimony that I claim the foregoing I have hereunto set my hand at Milwaukee, in the county of Milwaukee and State of Wisconsin.

NICHOLAS COLLION.